Patented Nov. 22, 1927.

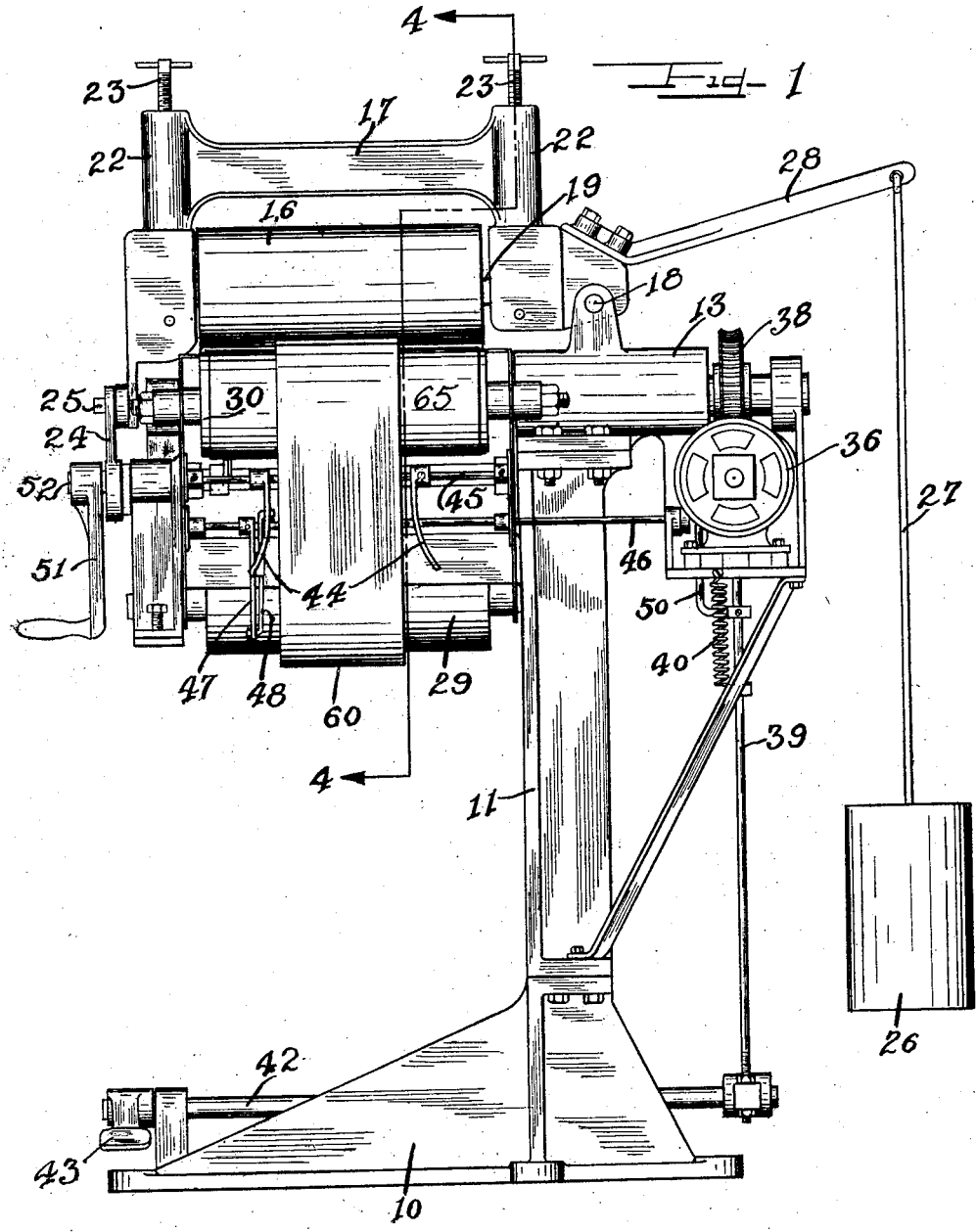

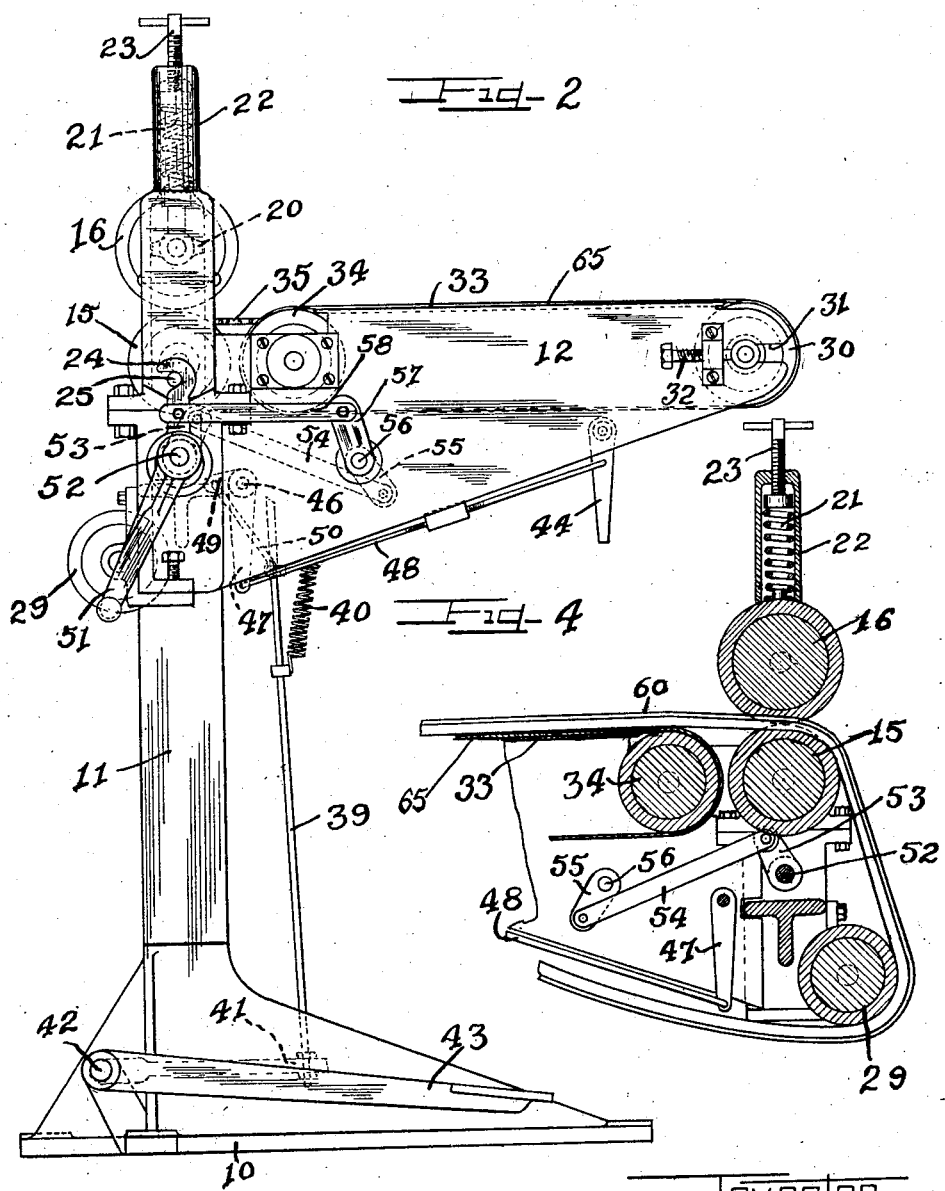

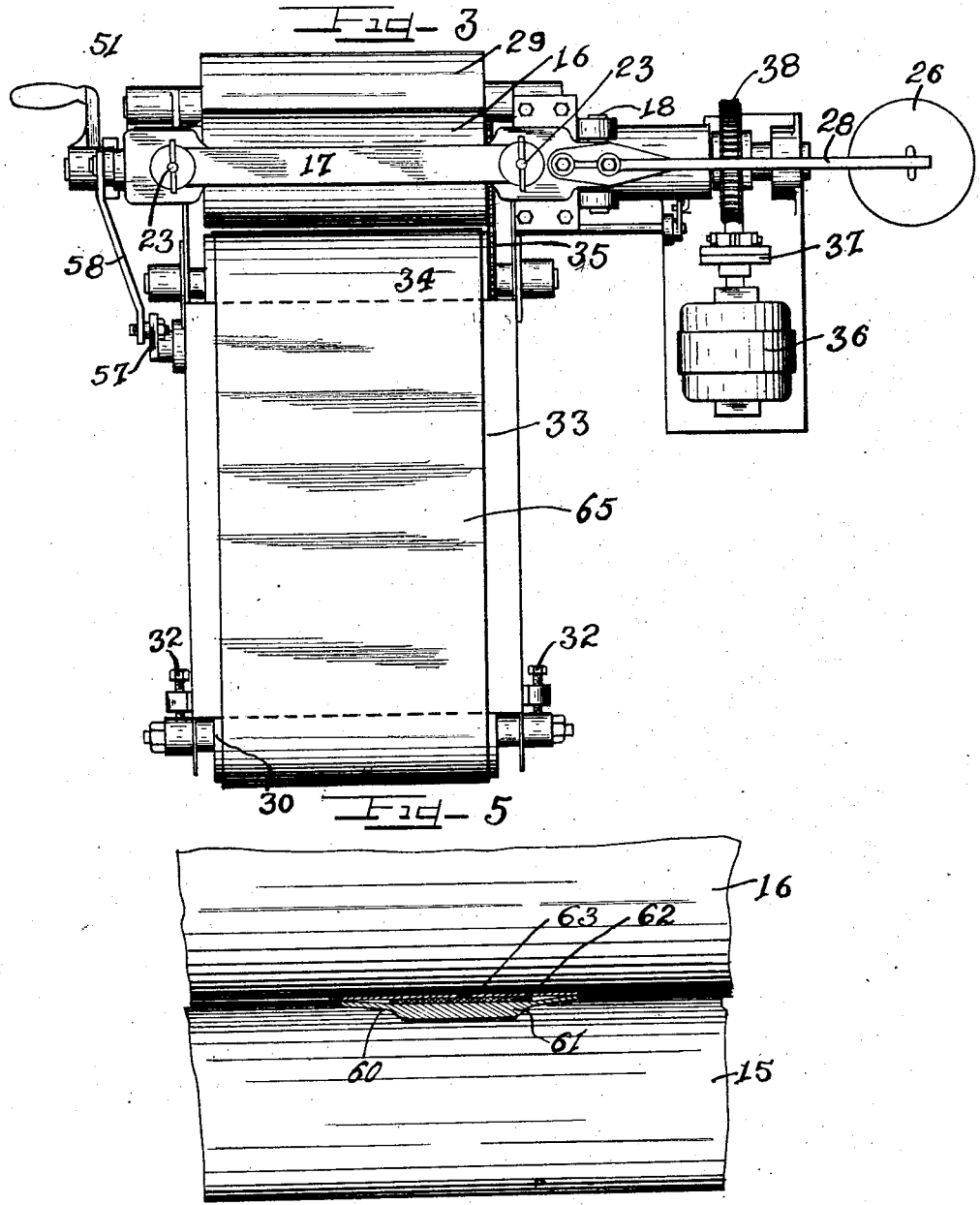

1,649,933

UNITED STATES PATENT OFFICE.

KENWORTHY J. THOMPSON, OF MANSFIELD, OHIO.

TREAD-BAND-BUILDING MACHINE.

Application filed August 11, 1924. Serial No. 731,320.

This invention relates to a machine and a method for making tire tread bands and the like.

It is an object of this invention to provide a method and apparatus for building up a tire tread band consisting of several parts, and forming them into an endless band in such a manner that the splices of the several components, as for example the tread, breaker strips and cushion, do not come together. In the usual manner of building up the tread portion as a straight slab and then splicing the ends of the slab together on the building core or drum, several disadvantages result. For example, due to the tacky and stretching nature of the material, the splice cannot be made perfectly as a production proposition because of over or under-lapping of some parts of the members of the built up slab, with the consequence that the tire at the splice is not usually uniform with the other parts. Such a compound splice is also more liable to split open than when the splices of succeeding layers are distributed around the circumference of an endless band. If to obviate juxtaposition of the splices in flat slabs the slabs are built up with step-offs, this method entails much additional labor both in building up the slab and in assembling the slab on a tire.

It is also an object of this invention to provide a moving apron adapted to feed the tread band and the parts added thereto to the compression rollers at a speed relative to the peripheral speed of said rollers such as to insure that wrinkling or fluting of the successive layers is prevented. The provision of a driven apron also prevents stretching of the tire band due to the tacky nature thereof which tends to drag over a stationary surface, in some cases stretching the band from three to eight inches. A further advantage of such an apron resides in guiding the tire band squarely up to the compression rollers.

It is a further object of this invention to arrange the guiding and feeding mechanism so that no difficulty will be encountered in inserting an already spliced endless tread and removing the completed endless band after the addition of the component parts, although, if preferred, the tread may be spliced on the feed apron.

It is another object of this invention to provide means for tensioning and aligning the moving apron comprising an idler roll carried in individually adjustable bearings permitting change of alignment of the roll to correct any tendency of the apron to run out of true; as well as permitting tensioning of the apron by bodily displacement of the roll.

It is a further object of this invention to provide adjustable guiding means for the tire band, the outer of which is movable and interconnected to the operating mechanism in such a way as to be brought into position prior to starting the machine.

Other and further important objects of this invention will be apparent from the disclosures in the specification and accompanying drawings.

The invention (in a preferred form) is illustrated on the drawings and hereinafter more fully described.

On the drawings:

Figure 1 is a front elevation of a machine embodying the features of this invention.

Figure 2 is a side elevation of the machine.

Figure 3 is a plan view of the machine.

Figure 4 is a fragmentary section on the line 4—4 of Figure 1.

Figure 5 is an enlarged fragmentary detail to show the tread band as it passes through the compression rolls.

As shown on the drawings:

A base 10 is indicated in the figures, to one corner of which is attached a standard 11, which carries an outstanding table 33 with integral supporting side plates 12, secured to the standard. Slots 31 are formed in the outer ends of the table side plates for adjustable bearings for an idler roll 30, the bearings being held in adjustment by backing screws 32. A second idler roll 29 is mounted in bearings secured to the standard. A housing 13 is secured to the top of the standard and includes bearings for a driven roll 15, which is driven by a motor 36 connected by a clutch 37 to a worm reduction gearing, the worm gear 38 of which is shown on an extension on the roll shaft. The clutch is controlled by a rod 39 connected to an arm 41 mounted on one end of a shaft 42 carried by the base 10, to the other end of which is secured a foot pedal 43. By depressing this pedal, the clutch is thrown into action and release of the pedal throws the clutch out of action.

Supported above the driven roll 15 is a compression roll 16 carried in a hinged frame 17 pivoted in a lug 18 on the housing and counterbalanced by means of a weight 26 hung by means of a rod 27 from the arm 28 attached to the frame 17. The bearings 20 for the roll shaft 19 are slidable in suitable ways in the frame and are spring urged downwardly by springs 21 in bosses 22 on the frame, screws 23 serving to adjust the spring pressure.

The rolls 15 and 16 are preferably formed with a fairly hard rubber center with a sponge or other soft rubber surface adapted to swallow the swell of the cross-section of a tread, as shown in Figure 5. The rolls are constructed in this way to obtain pressure over the entire surface of a tread band.

The free end of the frame 17 is normally connected to the frame 12 by means of a hook 24, rotatably secured to the table or housing and adapted to engage a pin 25 projecting from the free end of the frame 17. When the hook is disengaged from the pin 25, the frame 17 swings upwardly due to the counterweight 26.

A roll 34 is mounted at the inner end of the table 33 adjacent to the lower roll 15 and driven therefrom by a chain 35 at a peripheral speed slightly less than that of the roll 15. This is desirable because the compression rolls 15 and 16 cause some slippage of the tread on the rolls with the result that the tread must be brought up on the feed apron at a less speed than the peripheral speed of the rolls.

A canvas apron 65 is mounted over the rolls 30 and 34 and serves to feed the tire band to the compression rolls without initial stretching until the band leaves the roller 34. The adjustable bearings for the roll 30 allow adjustment that insures the apron will run true over the rollers, as a misalignment of the rollers would cause the apron to creep to one side.

To keep the band in position on the rolls, a pair of curved guide fingers 44 are provided, one on each side of the band, as shown more particularly in Figure 1. These fingers are mounted on a shaft 45 journaled in the frame 12 so that they may be swung out of the way of the band when the latter is to be inserted or withdrawn. As this becomes necessary at the time the clutch 37 is thrown out and their function as guides is only required when the clutch is thrown in, the mechanism which operates the clutch may to advantage also operate the guide fingers 44. For this purpose, a shaft 46 is provided carrying at one end an arm 47, connected to one of the fingers 44 by a rod 48, and at the other end an arm 49, at right angles to the arm 47, connected to the rod 39, which operates the clutch by a rod 50.

The hook 24 which releasably holds the frame 17 in its lower operative position is manually operated by a lever 51 secured to a stub shaft 52. This shaft also carries an eccentric upon which the hook 24 is rotatably mounted. The lever 51 is connected to the hook by means of an arm 53 secured to the shaft 52, link 54, arm 55, shaft 56, arm 57 and link 58. In view of its eccentric mounting as the lever 51 is turned the hook is simultaneously moved towards the pin 25 on the frame 17 and drawn downwards so that the roll 16 is firmly pressed against the tread band.

The operation is as follows:

The construction of the tire band 60 is as shown in Figure 5. It comprises a tread portion proper 61 which is ordinarily cut to length, spliced and delivered to the machine as an endless band, one or more breaker strips 62, with intervening cushion strips of rubber, if the specifications call for the same, and a final strip of cushion rubber 63. These parts are applied to the tread band one at a time with butt or lap joints distributed around the band.

The operation of opening up the machine to receive a tread band or to remove the same will be apparent from the description of the structure. In the method of this invention, the machine is opened up and a spliced band of tread stock is inserted wrong side out so that the surface to which the other elements are to be added is uppermost on the table of the machine. If desired, the tread stock may be spliced on the table of the machine. After closing the machine and engaging the clutch, the moving apron 65 feeds the tread band towards the rolls at a linear speed slightly less than the peripheral speed of the compression rolls. This is a very important feature of this invention as, if the feed should be equal to the peripheral speed of the rolls, the material would bulge in front thereof and result in fluting because of the squeezing action of the rolls and also because of some slippage or yielding of the soft surface of the rolls. The moving apron serves to pick up the tread band and carry it forward over the table. Due to the tacky nature of the tread, an attempt to drag it over the stationary table 33 would result in considerable stretching of the yielding tread which could not be accurately predetermined and therefore would spoil the tread band by giving a circumference that would not suitably fit the tire. The curved guide arms 44 serve to align the tread band on the moving apron to feed the same squarely up to the compression rolls.

With unusually tacky tread stock, it might be necessary to duplicate the moving apron 65, placing the duplicate around the rollers 15 and 29.

I am aware that numerous details of construction may be varied through a wide range without departing from the principles of this invention, and I therefore do not purpose limiting the patent granted, otherwise than necessitated by the prior art.

I claim as my invention:

1. The method of forming endless tire bands comprising feeding an endless band of tread stock to driven compression rollers at a linear speed slightly less than the peripherial speed of the rollers, adding layers of breaker and cushion stock, and splicing each layer at different points in the circumference of the tire band.

2. The method of forming endless tire bands comprising splicing a strip of tread stock of the proper length, passing it over a feeding apron driven at a given linear speed and thence through soft surfaced compression rollers driven at a slightly greater peripheral speed, and adding separate layers of breaker and cushion stock, rolling and splicing each layer into place on the tread band.

3. A machine of the kind described comprising a substantially cylindrical roll adapted to support a tire tread, means for driving such roll, a roll adapted to press the tire tread against such driven roll, and a second driven roll driven at a slightly lower peripheral speed than the first driven roll arranged to contact with the tread before it reaches the first driven roll whereby the tread is fed between such driven rolls without wrinkling.

4. A machine of the kind described comprising three substantially cylindrical rolls triangularly arranged for the carriage and support of a tire tread, means for driving one of said rolls, a roll adapted to press the tire tread against such driven roll and a second driven roll driven at a slightly lower peripheral speed than the first driven roll arranged to contact with the tread before it reaches the first driven roll whereby the tread is fed between such driven rolls at a speed preventing wrinkling.

5. A machine of the kind described comprising a frame, a plurality of rolls on said frame adapted to support an endless band in extended position, a support for said frame connected thereto on one side only to enable the endless band to be inserted on or taken off the rolls, and a guide for the edges of the band adapted to be retracted out of the plane of said band when the band is to be inserted on or taken off the rolls.

6. A machine of the kind described comprising a frame, a plurality of rolls on said frame adapted to support an endless band in extended position, a source of power, a clutch connected between such source and one of said rolls, a guide for the edge of said band adapted to be retracted when the band is to be inserted on or taken off the rolls, and means for simultaneously disconnecting said clutch and retracting said guide.

7. A machine of the kind described comprising a frame, a plurality of rolls on said frame adapted to support an endless band in extended position, a support for said frame connected thereto on one side only to enable the endless band to be inserted on or taken off the rolls, a source of power, a clutch connected between such source and one of said rolls, a guide for the edge of said band adapted to be retracted when the band is to be inserted on or taken off the rolls, and means for simultaneously disconnecting said clutch and retracting said guide.

8. A tire tread rolling machine including a pair of compression rollers comprising a relatively hard central portion and a relatively soft external portion adapted to yieldingly conform to the cross-section of a tire tread, and a feeding apron having a drive connected to one of said rollers in such a way as to be driven at a linear speed slightly less than the peripheral speed of said rollers for feeding the tire tread thereto.

9. A machine of the kind described, comprising a substantially cylindrical roll adapted to support a tire tread, means for driving said roll, a roll adapted to press the tire tread against such driven roll, one of said rollers comprising a relatively hard central portion and a relatively soft external portion adapted yieldingly to conform to the cross-section of a tire-tread, and a second driven roll driven at a slightly lower peripheral speed than the first driven roll arranged to contact with the tread before it reaches the first driven roll whereby the tread is fed between such driven rolls without wrinkling.

10. A machine of the kind described, comprising a substantially cylindrical roll adapted to support a tire tread, means for driving said roll, a roll adapted to press the tire tread against such driven roll, one of said rollers comprising a relatively hard central portion and a relatively soft external portion adapted yieldingly to conform to the cross-section of a tire tread, and a feeding apron having a drive connected to one of said rollers in such a way as to be driven at a linear speed slightly less than the peripheral speed of said rollers for feeding the tire tread thereto.

In witness whereof I have hereunto subscribed my name.

KENWORTHY J. THOMPSON.